United States Patent
Li

(10) Patent No.: US 9,557,609 B2
(45) Date of Patent: Jan. 31, 2017

(54) METHOD FOR MANUFACTURING POLYMER DISPERSED LIQUID CRYSTAL (PDLC) PANEL

(71) Applicant: BOE TECHNOLOGY GROUP CO., LTD., Beijing (CN)

(72) Inventor: Mingchao Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/370,128

(22) PCT Filed: Sep. 17, 2013

(86) PCT No.: PCT/CN2013/083595
§ 371 (c)(1),
(2) Date: Jul. 1, 2014

(87) PCT Pub. No.: WO2014/187050
PCT Pub. Date: Nov. 27, 2014

(65) Prior Publication Data
US 2015/0309345 A1 Oct. 29, 2015

(30) Foreign Application Priority Data
May 24, 2013 (CN) .......................... 2013 1 0198447

(51) Int. Cl.
*G02F 1/1333* (2006.01)
*G02F 1/1341* (2006.01)
*G02F 1/1334* (2006.01)

(52) U.S. Cl.
CPC ........... *G02F 1/1341* (2013.01); *G02F 1/1333* (2013.01); *G02F 1/1334* (2013.01)

(58) Field of Classification Search
CPC .............................. G02F 1/1341; G02F 1/1334
See application file for complete search history.

(56) References Cited

U.S. PATENT DOCUMENTS

| 4,613,207 A | 9/1986 | Fergason |
| 5,469,278 A | 11/1995 | Takahara et al. |
| (Continued) | | |

FOREIGN PATENT DOCUMENTS

| CN | 1112685 A | 11/1995 |
| CN | 1117142 A | 2/1996 |
| (Continued) | | |

OTHER PUBLICATIONS

International Search Report, International Preliminary Report on Patentability and Written Opinion of the International Searching Authority of PCT/CN2013/083595 in Chinese, mailed Mar. 6, 2014.
(Continued)

*Primary Examiner* — Donald Raleigh
(74) *Attorney, Agent, or Firm* — Collard & Roe, P.C.

(57) ABSTRACT

A method for manufacturing a polymer dispersed liquid crystal (PDLC) panel, which comprises: obtaining a liquid crystal mixture by uniformly mixing liquid crystal molecules, a photoinitiator and a prepolymer; forming a liquid crystal cell (23) by injecting the obtained liquid crystal mixture into an empty liquid crystal cell (22); and obtaining the PDLC panel by adopting uniformly alternated intense and weak light to irradiate the liquid crystal cell (23) to allow the liquid crystal mixture in the liquid crystal cell (23) to be subjected to polymerization. By adoption of the method, the manufactured PDLC panel has uniform brightness.

14 Claims, 3 Drawing Sheets

(56) References Cited

U.S. PATENT DOCUMENTS

| | | | |
|---|---|---|---|
| 5,668,651 A | 9/1997 | Yamada et al. | |
| 5,701,396 A * | 12/1997 | Liedenbaum | G06E 3/001 |
| | | | 706/40 |
| 5,751,382 A | 5/1998 | Yamada et al. | |
| 6,166,834 A * | 12/2000 | Taketomi | G02B 6/005 |
| | | | 349/5 |
| 6,313,894 B1 * | 11/2001 | Sekine | G02F 1/1334 |
| | | | 349/88 |
| 2002/0126332 A1 * | 9/2002 | Popovich | G02B 5/32 |
| | | | 359/15 |
| 2002/0196393 A1 * | 12/2002 | Tashiro | G02F 1/1303 |
| | | | 349/106 |
| 2008/0088756 A1 * | 4/2008 | Tseng | G02B 1/06 |
| | | | 349/33 |
| 2008/0108727 A1 * | 5/2008 | Roberts | C09D 4/00 |
| | | | 522/172 |
| 2010/0231997 A1 * | 9/2010 | Fontecchio | G02F 1/13342 |
| | | | 359/3 |
| 2013/0286343 A1 | 10/2013 | Xu | |

FOREIGN PATENT DOCUMENTS

| | | |
|---|---|---|
| CN | 101551542 A | 10/2009 |
| CN | 102681259 A | 9/2012 |
| CN | 102902106 A | 1/2013 |
| TW | I341928 B | 5/2011 |
| TW | I383181 B | 1/2013 |

OTHER PUBLICATIONS

Chinese Office Action of Chinese Application No. 201310198447.X, mailed Mar. 25, 2015 with English translation.

English Translation of the International Search Report of PCT/CN2013/083595 published in English on Apr. 2, 2015.

English translation of the International Preliminary Report on Patentability and Written Opinion of the International Searching Authority of PCT/CN2013/083595, issued Nov. 24, 2015.

* cited by examiner

METHOD FOR MANUFACTURING POLYMER DISPERSED LIQUID CRYSTAL (PDLC) PANEL

CROSS REFERENCE TO RELATED APPLICATIONS

This application is the National Stage of PCT/CN2013/083595 filed on Sep. 17, 2013, which claims priority under 35 U.S.C. §119 of Chinese Application No. 201310198447.X filed on May 24, 2013, the disclosure of which is incorporated by reference.

TECHNICAL FIELD

The embodiments of the present invention relate to a method for manufacturing a polymer dispersed liquid crystal (PDLC) panel.

BACKGROUND

A polymer dispersed liquid crystal (PDLC) is a material which is obtained by mixing low-molecular liquid crystals with a prepolymer, allowing the obtained mixture undergoing polymerization under certain conditions, and uniformly dispersing micro-size liquid crystal droplets within a polymer network, and have the electro-optical response characteristics obtained through utilization of the dielectric anisotropy of the liquid crystal molecules. The PDLC mainly works between a scattered state and a transparent state and has certain grayscale. Compared with a traditional LCD device, a PDLC display has a plurality of advantages. For instance, a polarizer and an alignment layer are not required any more; the manufacturing process is simple; and a large-area flexible display can be easily manufactured. At present, the PDLC has been widely applied in the aspects of optical modulators, thermosensitive and pressure-sensitive devices, electric control glass, light valves, projection display, e-books, and etc.

One traditional method for manufacturing a PDLC panel is as follows. At firstly, liquid crystals are mixed with a prepolymer, and the mixture is filled between an array substrate and a color filter substrate which are arranged opposite to each other to form a liquid crystal cell; subsequently, light is adopted to irradiate the liquid crystal cell filled with the mixture and the mixture in the liquid crystal cell is subjected to polymerization under action of the light to produce high molecular polymers; the high molecular polymers are irradiated by the light to form spatial frame (bone) structures, and recess structures are formed among frames; and when liquid crystals move towards recess portions, a dispersed system is formed so that the liquid crystals are dispersed in a polymer network, and hence the PDLC panel can be obtained.

SUMMARY

The embodiments of the present invention provide a method for manufacturing a PDLC panel, and the manufactured PDLC panel has more uniform brightness.

In one aspect, the present invention provides a method for manufacturing a PDLC panel, which comprises: obtaining a liquid crystal mixture by uniformly mixing liquid crystal molecules, a photoinitiator and a prepolymer; forming a liquid crystal cell by injecting the obtained liquid crystal mixture into an empty liquid crystal cell; and obtaining the PDLC panel by adopting uniformly alternated intense and weak light to irradiate the liquid crystal cell to allow the liquid crystal mixture in the liquid crystal cell to be subjected to polymerization.

For instance, in the above method, the liquid crystal mixture is formed by uniformly mixing the liquid crystal molecules, the photoinitiator and the prepolymer at a ratio of mass percentages of $(79\pm5)\%:(1\pm0.05)\%:(20\pm5)\%$.

For instance, in the above method, the process of adopting the uniformly alternated intense and weak light to irradiate the liquid crystal cell may comprise: placing a mask plate over the liquid crystal cell and forming a pattern with uniformly alternated transparency degrees on the mask plate; forming the uniformly alternated intense and weak light by adopting light to irradiate and pass through the mask plate; and applying the formed uniformly alternated intense and weak light to irradiate the liquid crystal cell.

For instance, in the above method, before the step of adopting the light to irradiate the mask plate, the process of adopting the uniformly alternated intense and weak light to irradiate the liquid crystal cell further comprises: outputting light with a laser; and irradiating the light outputted by the laser to a beam expanding leans for beam expanding.

Or, different from the above process of using the mask plate, for instance, in the above method, the process of adopting the uniformly alternated intense and weak light to irradiate the liquid crystal cell may comprise: adopting light to irradiate a beam splitter to divide the light into transmission portions and reflection portions with uniformly alternated intensity, so as to form the uniformly alternated intense and weak light; and applying the formed uniformly alternated intense and weak light to irradiate the liquid crystal cell.

For instance, in the above method, before the step of adopting the light to irradiate the beam splitter, the process of adopting the uniformly alternated intense and weak light to irradiate the liquid crystal cell may comprise: outputting the light through a laser; and irradiating the light outputted by the laser to a beam expanding lens for beam expanding.

For instance, in the above method, that the liquid crystal mixture in the liquid crystal cell being subjected to polymerization may comprise: the liquid crystal mixture in the liquid crystal cell, irradiated by intense light, being subjected to polymerization at first to form polymer frames; and the liquid crystal mixture in the liquid crystal cell, irradiated by weak light, being subjected to polymerization subsequently to form recesses among the polymer frames.

In the above method, for the compound in the liquid crystal cell to be subjected to polymerization, for instance, the light adopted to irradiate the liquid crystal cell may be ultraviolet light.

For instance, in the above method, the process of injecting the obtained liquid crystal mixture into the empty liquid crystal cell may comprises: injecting the obtained liquid crystal mixture into the empty liquid crystal cell by means of vacuum injection.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

In the process of manufacturing the traditional PDLC display, the inventor noted the problem that uneven distribution of high molecular polymers will inevitably occur in the process of compound curing, namely high-molecular frames are unevenly distributed and recesses among the high-molecular frames are unevenly distributed, and hence the PDLC panel has uneven brightness, and consequently the overall display effect of the LCD panel can be adversely affected. The recesses among the high-molecular frames are in recessed (rough) shape and may also be in hollow shape or the like.

Figure 1:
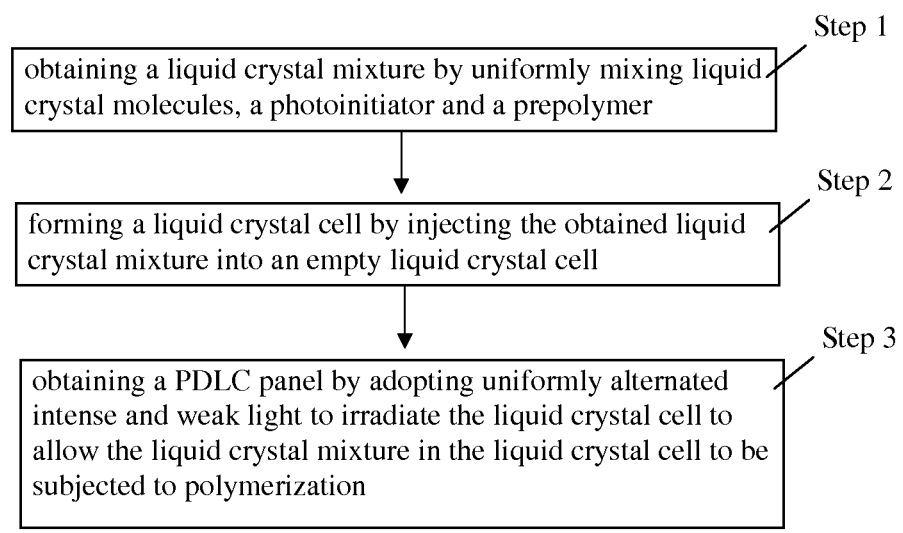
FIG. 1 is a schematic diagram of a method for manufacturing a PDLC panel provided by the embodiment of the present invention.

FIG. 1 is a schematic diagram of a method for manufacturing a PDLC panel provided by the embodiment of the present invention. As illustrated in FIG. 1, the method for manufacturing the PDLC panel comprises the following:

step 1: obtaining a liquid crystal mixture by uniformly mixing liquid crystal molecules, a photoinitiator and a prepolymer;

step 2: forming a liquid crystal cell by injecting the obtained liquid crystal mixture into an empty liquid crystal cell; and step 3: obtaining a PDLC panel by adopting uniformly alternated intense and weak light to irradiate the liquid crystal cell to allow the liquid crystal mixture in the liquid crystal cell to be subjected to polymerization.

In the embodiment, the uniformly alternated intense and weak light is applied to a surface of the liquid crystal cell in such a way that polymer frames (namely high-molecular frames) are formed by portions irradiated by intense light (light of high intensity) due to the polymerization of the prepolymer and recesses among the polymer frames are formed by portions irradiated by weak light (light of low intensity). Due to the uniform distribution of the frames and the recesses in the liquid crystal cell, liquid crystal molecules are uniformly distributed in the recesses, and hence a uniformly distributed polymer system is formed. Due to the uniformly alternated intense and weak light, portions with high intensity and portions with low intensity in a light-irradiating area on a plane are uniformly alternated.

According to the above principle, by adoption of the PDLC manufacturing process provided by the embodiment of the present invention, the liquid crystal molecules can be uniformly distributed in a high polymer material. Therefore, compared with the traditional manufacturing method, the method provided by the embodiment of the present invention alleviates the problem of uneven brightness of the PDLC panel and hence improves the overall quality of the PDLC panel.

Detailed steps of the method for manufacturing the PDLC panel will be given below with reference to the preferred embodiments 1 and 2.

Embodiment 1

Figure 2:
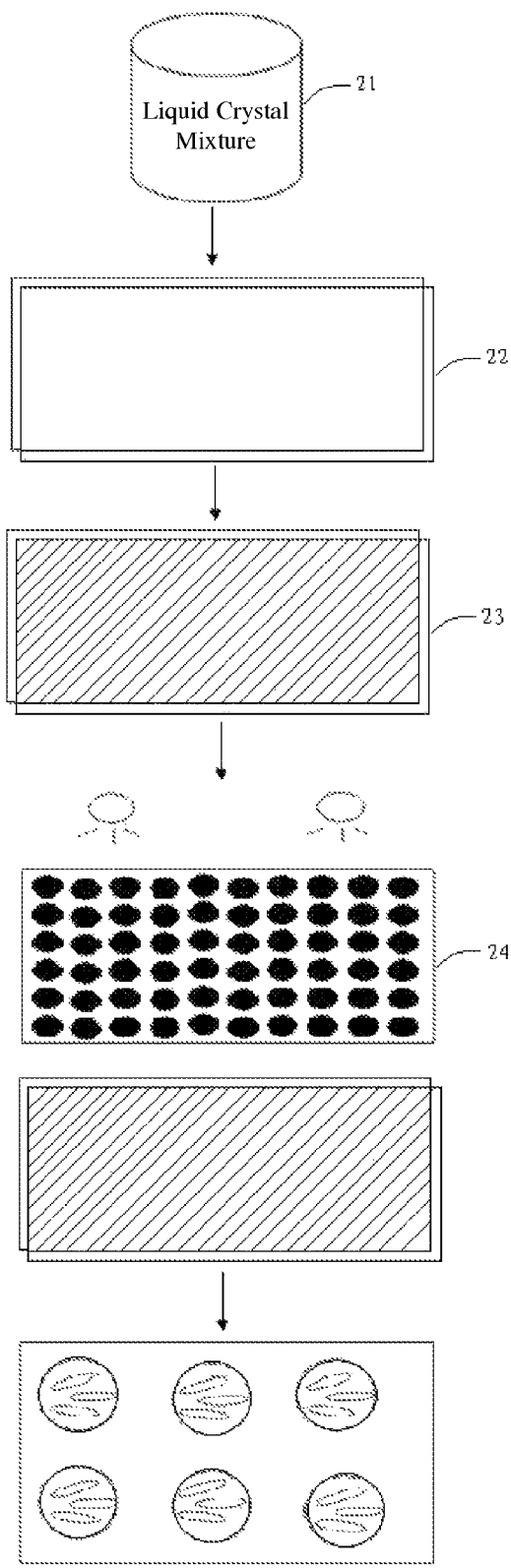
FIG. 2 is a schematic diagram of a method for manufacturing a PDLC panel provided by an embodiment 1 of the present invention.

As illustrated in FIG. 2, a method for manufacturing a PDLC panel, provided by the embodiment 1, comprises the following steps.

Step 201: obtaining a liquid crystal mixture 21 by uniformly mixing liquid crystal molecules, a photoinitiator and a prepolymer.

For instance, the liquid crystal mixture is obtained by uniformly mixing the liquid crystal molecules, the photoinitiator and the prepolymer at a ratio of mass percentages of $(79\pm5)\%:(1\pm0.05)\%:(20\pm5)\%$ as long as the sum of the percentage of the three substances, floating within the range, is equal to a hundred percent. The test result indicates that polymers and liquid crystals formed after the polymerization of the liquid crystal mixture formed by mixing at the ratio have good light transmittance, and hence the manufactured PDLC panel has good brightness.

Preferably, the mass ratio of the liquid crystal molecules, the photoinitiator and the prepolymer may be 79:1:20.

For instance, the prepolymer may comprises trimethylolpropane triacrylate (TMPTA), isobutyl methacrylate (IBMA), (meth)isobornyl acrylate (IBOA) or the like, which has a single functional group, and may also comprises 1,3-butanediol diacrylate (BDDA), dipropylene glycol diacrylate (DPGDA), polyethylene glycol diacrylate (PEGDA) or the like, which has a bifunctional group.

The photoinitiator may also be called as photosensitizer or photocuring agent, and is a compound capable of absorbing energy at a certain wavelength in an ultraviolet region (250-420 nm) or a visible region (400-800 nm), producing free radicals, cations and so on, and hence causing monomer polymerization, crosslinking and curing. The photoinitiator, for instance, may comprises Irgacure series 650-659 or DP series 1030, 3100, 5000, 5100, 5120, or the like.

For instance, the liquid crystal molecules are molecules obtained by the combination of flexible structures (FS), rigid structures (RS), and electrondrawing groups (EG).

For instance, the RS may comprise:

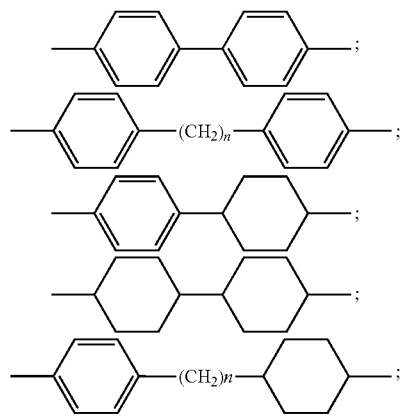

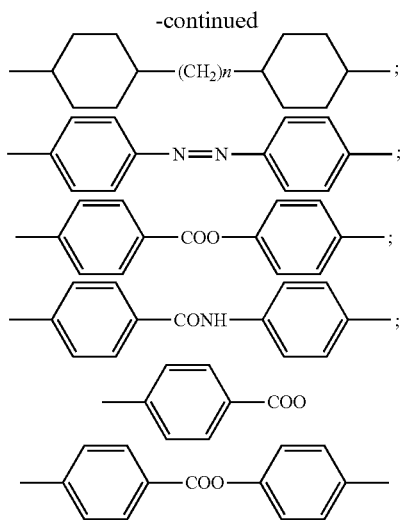

or the like, or a composite or a mutual composite of other five-membered rings and six-membered rings having rigidity and stable chemical structures.

For instance, the FS may comprise —CnH2n+1 (n is an integer), —OCnH2n+1 (n is an integer) or the like.

For instance, the EG may comprise a group having large electronegativity, e.g., —CN, —X (X is a halogen element), etc.

The liquid crystal molecules involved in the present invention, for instance, may comprise M series 11-1560, 11-1159, etc., C series 5220, 5221, 5213, etc., S series 069015, etc.

Step 202: forming a liquid crystal cell 23 by injecting the obtained liquid crystal mixture into an empty liquid crystal cell 22.

The empty liquid crystal cell is formed by an array substrate and an opposed substrate (e.g., a color filter substrate) which are sealed by a sealant and arranged opposite to each other, and the liquid crystal cell is formed by injecting liquid crystals into the empty liquid crystal cell. In the present step, for instance, the liquid crystal mixture is injected into the empty liquid crystal cell by means of vacuum injection to obtain the liquid crystal cell. By adoption of the vacuum injection process, the liquid crystal mixture can be better penetrated into edge regions of the empty liquid crystal cell, so that less air bubbles may be produced, and hence the injection effect can be improved. Therefore, the process can be shortened and the production efficiency can be improved.

It should be noted that the meaning of forming the liquid crystal cell by injecting the obtained liquid crystal mixture into the empty liquid crystal cell is not limited to the case of injecting the liquid crystals after performing cell assemble of the array substrate and the color filter substrate, and also comprises the case of performing cell assemble on the array substrate and the color filter substrate after preparing a sealant on the array substrate and dripping the liquid crystals in the sealant.

Step 203: placing a mask plate 24 on the liquid crystal cell and forming a pattern with uniformly alternated transparency degrees on the mask plate 24.

According to the actual practice, the pattern on the mask plate 24 may be formed by the uniformly alternated arrangement of completely transparent portions and completely opaque portions or semitransparent portions (i.e., of a certain grayscale), and hence the pattern with uniformly alternated transparency degrees can be formed. By adoption of the pattern, uniformly alternated intense and weak light can be produced after light runs through the mask plate.

Step 204: outputting light with a laser.

The laser in the step may comprises a neodymium:yttrium aluminum garnet (Nd:YAG) laser. By adoption of the Nd:YAG laser to output the light, good beam quality can be obtained. Moreover, the Nd:YAG laser adopts a laser diode (LD) as a pumping source, has the advantages of small volume, light weight, high efficiency and long service life, does not require a cooling system, and provides favorable condition for the miniaturization of a laser system.

Step 205: irradiating the light outputted by the laser to a beam expanding lens for beam expanding.

Beams of a larger area can be obtained after the beam expanding of the beam expanding lens. Moreover, the applied beam expanding lens also has the function of space filtering; the beam expanding lens can absorb light within other wavelength ranges and only allows ultraviolet light at the wavelength of 254 nanometers to pass through, and the light adopted to irradiate the liquid crystal cell is the ultraviolet light. The prepolymer in the liquid crystal mixture injected into the liquid crystal cell can be subjected to polymerization when irradiated by the ultraviolet light, and hence high molecular polymers can be formed. Of course, a laser capable of only emitting the ultraviolet light may also be adopted in the step 204.

Step 206: applying the formed uniformly alternated intense and weak light to irradiate the liquid crystal cell.

After the formed uniformly alternated intense and weak light is irradiated onto a surface of the liquid crystal cell, portions irradiated by intense light of the liquid crystal mixture in the liquid crystal cell are subjected to polymerization at first to form polymer frames and portions irradiated by weak light are subjected to polymerization subsequently to form recesses among the polymer frames. Along with the continuous polymerization, the liquid crystal mixture at regions subjected to polymerization at first in the liquid crystal cell is cured at first, namely uniform high molecular polymer frames are formed at the regions subjected to polymerization at first; the prepolymer at regions subjected to polymerization subsequently tends to move towards cured regions; and hence uniformly distributed recesses among the polymer frames can be easily obtained at the regions subjected to polymerization subsequently. The liquid crystal molecules can be uniformly distributed in the recesses among the frames, and hence a uniformly distributed polymer system can be formed.

In practice, the steps in the embodiment 1 may have various variations. For instance, in the embodiment 1, the steps 204 and 205 may be executed at first and the step 203 is executed subsequently. Moreover, for instance, the steps 204 and 205 may be omitted and a lamp capable of emitting the ultraviolet light is directly applied to directly irradiate the liquid crystal cell injected with the liquid crystal mixture.

As ultraviolet light is adopted to irradiate the mask plate in the embodiment 1, the method provided by the embodiment 1 may be referred to as "ultraviolet mask method".

Embodiment 2

Figure 3:
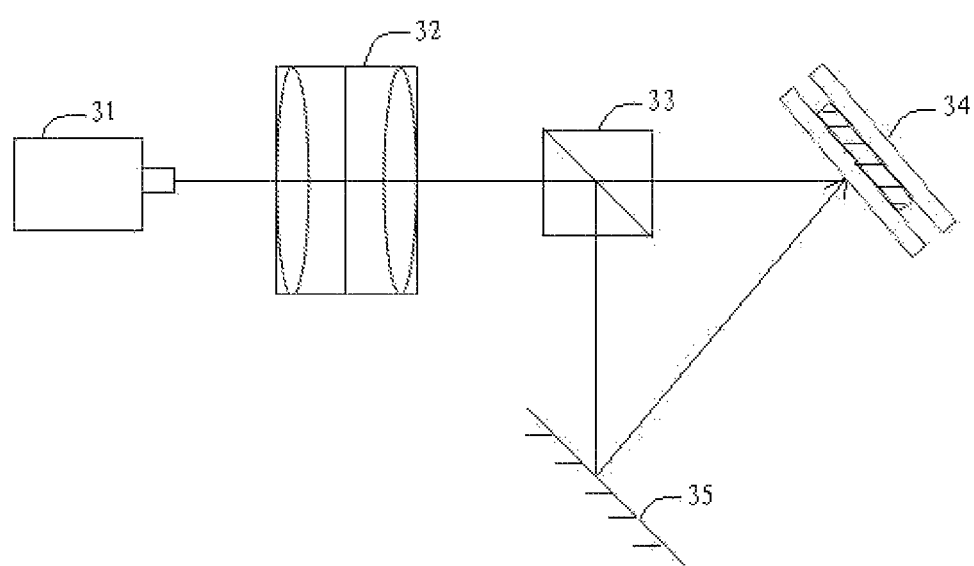
FIG. 3 is a schematic diagram of a method for manufacturing a PDLC panel provided by an embodiment 2 of the present invention

As illustrated in FIG. 3, another method for manufacturing a PDLC panel provided by the embodiment 2 comprises the following:

step 301: obtaining a liquid crystal mixture by uniformly mixing liquid crystal molecules, a photoinitiator and a prepolymer;

step 302: forming a liquid crystal cell 34 by injecting the obtained liquid crystal mixture into an empty liquid crystal cell;

step 303: outputting light with a laser 31; and step 304: irradiating the light outputted by the laser to a beam expanding lens 32 for beam expanding.

It should be noted that: as the steps 301 to 304 in the embodiment are correspondingly the same as the steps 201 to 204 in the embodiment 1, even there are some slight differences between the embodiment 1 and the embodiment 2, those skilled in the art may also deduce reasonably on the basis of relevant knowledge in the field, so that no further description will be given here. The differences between the embodiment 2 and the embodiment 1 will be given below.

Step 305: adopting the light to irradiate a beam splitter 33 to divide the light into transmission portions and reflection portions with uniformly alternated intensity, so as to form uniformly alternated intense and weak light.

After the light obtained after beam expanding is subjected to beam splitting by the beam splitter, transmission light and reflection light with certain intensity ratio are obtained. That is to say, the light is divided into two beams, namely intense transmission light and weak reflection light; or the light is divided into two beams, namely weak transmission light and intense reflection light. One beam is directly irradiated on the surface of the liquid crystal cell and the other beam is irradiated on the surface of the liquid crystal cell after reflected by a reflector 35. Therefore, the intense and weak light obtained by the uniformly alternated distribution of transmission portions and reflection portions are irradiated on the surface of the liquid crystal cell, and finally the uniformly alternated intense and weak light can be formed.

Step 306: adopting the uniformly alternated intense and weak light formed by beam splitting to irradiate a liquid crystal cell 34.

After the uniformly alternated intense and weak light formed after beam splitting is irradiated to the surface of the liquid crystal cell, portions, irradiated by intense light, of the liquid crystal mixture in the liquid crystal cell are subjected to polymerization at first to form polymer frames, and portions irradiated by weak light are subjected to polymerization subsequently to form recesses among the polymer frames. Along with the continuous polymerization, the liquid crystal mixture at regions subjected to polymerization at first in the liquid crystal cell is cured at first, namely uniform high molecular polymer frames are formed at the regions subjected to polymerization at first; the prepolymer at regions subjected to polymerization subsequently tends to move towards cured regions; and hence uniformly distributed recesses among the polymer frames can be easily formed at the regions subjected to polymerization subsequently. The liquid crystal molecules can be uniformly distributed in the recesses among the frames, and hence a uniformly distributed polymer system can be formed.

As a holographic exposure experimental optical path is adopted in the embodiment 2, the method provided by the embodiment 2 may be referred to as "holographic exposure method".

In the method for manufacturing the PDLC panel provided by the embodiments of the present invention, the uniformly alternated intense and weak light is applied to the surface of the liquid crystal cell in such a way that polymer frames (namely high-molecular frames) are formed by portions irradiated by intense light due to the polymerization of the prepolymer, and recesses among the polymer frames are formed by portions irradiated by weak light. Due to the uniform distribution of the frames and the recesses in the liquid crystal cell, the liquid crystal molecules are uniformly distributed in the recesses, and hence a uniformly distributed polymer system is formed. According to the above principle, by adoption of the PDLC manufacturing process provided by the embodiments of the present invention, the liquid crystal molecules can be uniformly distributed in high polymer materials. Therefore, compared with the traditional method, the method provided by the embodiments of the present invention mainly alleviates the problem of uneven brightness of the PDLC panel and hence improves the overall quality of the PDLC panel.

The foregoing is only the preferred embodiments of the present invention and not intended to limit the scope of protection of the present invention. The scope of protection of the present invention should be defined by the appended claims.

The invention claimed is:

1. A method for manufacturing a polymer dispersed liquid crystal (PDLC) panel, comprising:

obtaining a liquid crystal mixture by uniformly mixing liquid crystal molecules, a photoinitiator and a prepolymer;

forming a liquid crystal cell by injecting the obtained liquid crystal mixture into an empty liquid crystal cell; and obtaining the PDLC panel by adopting spatially and uniformly alternated intense and weak light to irradiate the liquid crystal cell to allow the liquid crystal mixture in the liquid crystal cell to be subjected to polymerization, wherein the process of adopting the spatially and uniformly alternated intense and weak light to irradiate the liquid crystal cell comprises:

placing a mask plate over the liquid crystal cell and forming a pattern with uniformly alternated transparency degrees on the mask plate;

forming the spatially and uniformly alternated intense and weak light by adopting light to irradiate and pass through the mask plate; and applying the formed spatially and uniformly alternated intense and weak light to irradiate the liquid crystal cell.

2. The manufacturing method according to claim 1, wherein the liquid crystal mixture is formed by uniformly mixing the liquid crystal molecules, the photoinitiator and the prepolymer at a ratio of mass percentages of $(79\pm5)\%$:$(1\pm0.05)\%$:$(20\pm5)\%$.

3. The manufacturing method according to claim 1, before the step of adopting the light to irradiate the mask plate, further comprising:

outputting light with a laser; and irradiating the light outputted by the laser to a beam expanding leans for beam expanding.

4. The manufacturing method according to claim 1, wherein the process of adopting the spatially and uniformly alternated intense and weak light to irradiate the liquid crystal cell comprises:

adopting light to irradiate a beam splitter to divide the light into transmission portions and reflection portions with spatially and uniformly alternated intensity, so as to form the spatially and uniformly alternated intense and weak light; and applying the formed spatially and uniformly alternated intense and weak light to irradiate the liquid crystal cell.

5. The manufacturing method according to claim 4, before the step of adopting the light to irradiate the beam splitter, further comprising:
   outputting the light through a laser; and
   irradiating the light outputted by the laser to a beam expanding lens for beam expanding.

6. The manufacturing method according to claim 1, wherein the liquid crystal mixture in the liquid crystal cell being subjected to polymerization comprises:
   the liquid crystal mixture in the liquid crystal cell, irradiated by intense light, being subjected to polymerization at first to form polymer frames; and
   the liquid crystal mixture in the liquid crystal cell, irradiated by weak light, being subjected to polymerization subsequently to form recesses among the polymer frames.

7. The manufacturing method according to claim 1, wherein the light adopted to irradiate the liquid crystal cell is ultraviolet light.

8. The manufacturing method according to claim 1, wherein the process of injecting the obtained liquid crystal mixture into the empty liquid crystal cell comprises:
   injecting the obtained liquid crystal mixture into the empty liquid crystal cell by means of vacuum injection.

9. The manufacturing method according to claim 2, before the step of adopting the light to irradiate the mask plate, further comprising:
   outputting light with a laser; and
   irradiating the light outputted by the laser to a beam expanding leans for beam expanding.

10. The manufacturing method according to claim 2, wherein the process of adopting the spatially and uniformly alternated intense and weak light to irradiate the liquid crystal cell comprises:
   adopting light to irradiate a beam splitter to divide the light into transmission portions and reflection portions with spatially and uniformly alternated intensity, so as to form the spatially and uniformly alternated intense and weak light; and
   applying the formed spatially and uniformly alternated intense and weak light to irradiate the liquid crystal cell.

11. The manufacturing method according to claim 10, before the step of adopting the light to irradiate the beam splitter, further comprising:
   outputting the light through a laser; and
   irradiating the light outputted by the laser to a beam expanding lens for beam expanding.

12. The manufacturing method according to claim 2, wherein the liquid crystal mixture in the liquid crystal cell being subjected to polymerization comprises:
   the liquid crystal mixture in the liquid crystal cell, irradiated by intense light, being subjected to polymerization at first to form polymer frames; and
   the liquid crystal mixture in the liquid crystal cell, irradiated by weak light, being subjected to polymerization subsequently to form recesses among the polymer frames.

13. The manufacturing method according to claim 4, wherein the light adopted to irradiate the liquid crystal cell is ultraviolet light.

14. The manufacturing method according to claim 4, wherein the process of injecting the obtained liquid crystal mixture into the empty liquid crystal cell comprises:
   injecting the obtained liquid crystal mixture into the empty liquid crystal cell by means of vacuum injection.

* * * * *